United States Patent [19]

Gehman

[11] 4,310,880
[45] Jan. 12, 1982

[54] HIGH-SPEED SYNCHRONOUS COMPUTER USING PIPELINED REGISTERS AND A TWO-LEVEL FIXED PRIORITY CIRCUIT

[75] Inventor: John T. Gehman, Needham, Mass.

[73] Assignee: Nixdorf Computer Corporation, Burlington, Mass.

[21] Appl. No.: 73,597

[22] Filed: Sep. 10, 1979

[51] Int. Cl.³ .............................................. G06F 9/38
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,576,542 | 4/1971 | Floyd | 364/200 |
| 4,090,238 | 5/1978 | Russo | 364/200 |
| 4,159,519 | 6/1979 | Gupta | 364/200 |
| 4,187,539 | 2/1980 | Eaton | 364/200 |

FOREIGN PATENT DOCUMENTS 10188 10/1978 European Pat. Off. .
10197 10/1978 European Pat. Off. .

*Primary Examiner*—Raulfe B. Zache
*Attorney, Agent, or Firm*—Krass, Young & Schivley

[57] ABSTRACT

A digital processor including both macro and micro instruction generators. The micro-instruction generator comprises a sequencer for generating instruction addresses, a memory for generating instructions in response to the addresses and a pipeline register adapted to receive the instructions for execution. The sequencer operates at a constant CLK 1 rate while the pipeline register operates at a variable CLK 2 rate; i.e., the occurrence of a branch instruction in the pipeline register operates to inhibit CLK 2 for one CLK 1 time so as to prevent loading for execution of the aborted sequential instruction during the loading of a new non-sequential instruction address. CLK 2 resumes upon the next CLK 1 signal to resume sequential operation. Special branch instructions are utilized to fetch macro-instructions from a pipelined system of macro-instruction registers. A two-tier synchronous arbitration system for memory requests is also disclosed.

11 Claims, 4 Drawing Figures

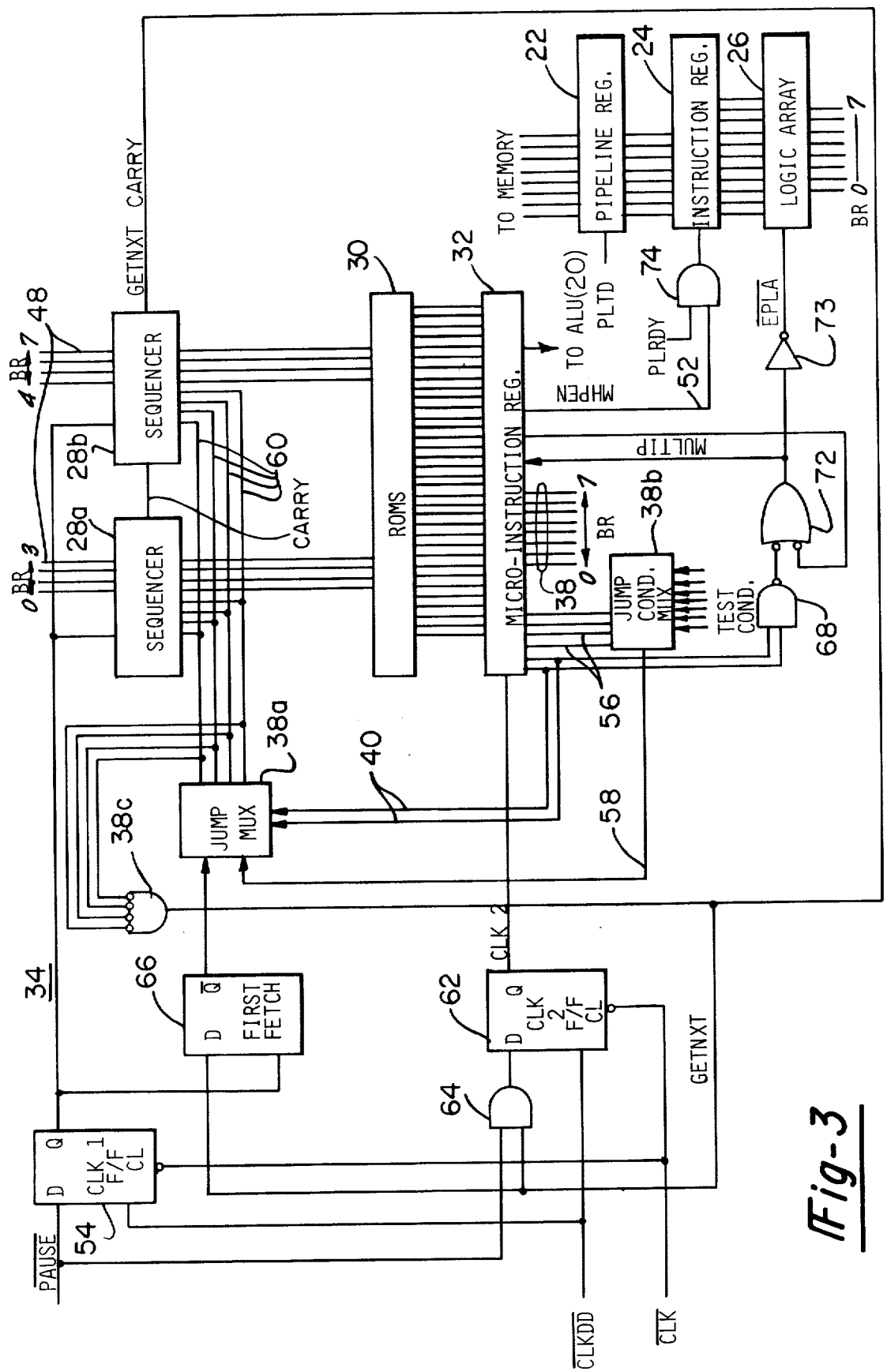

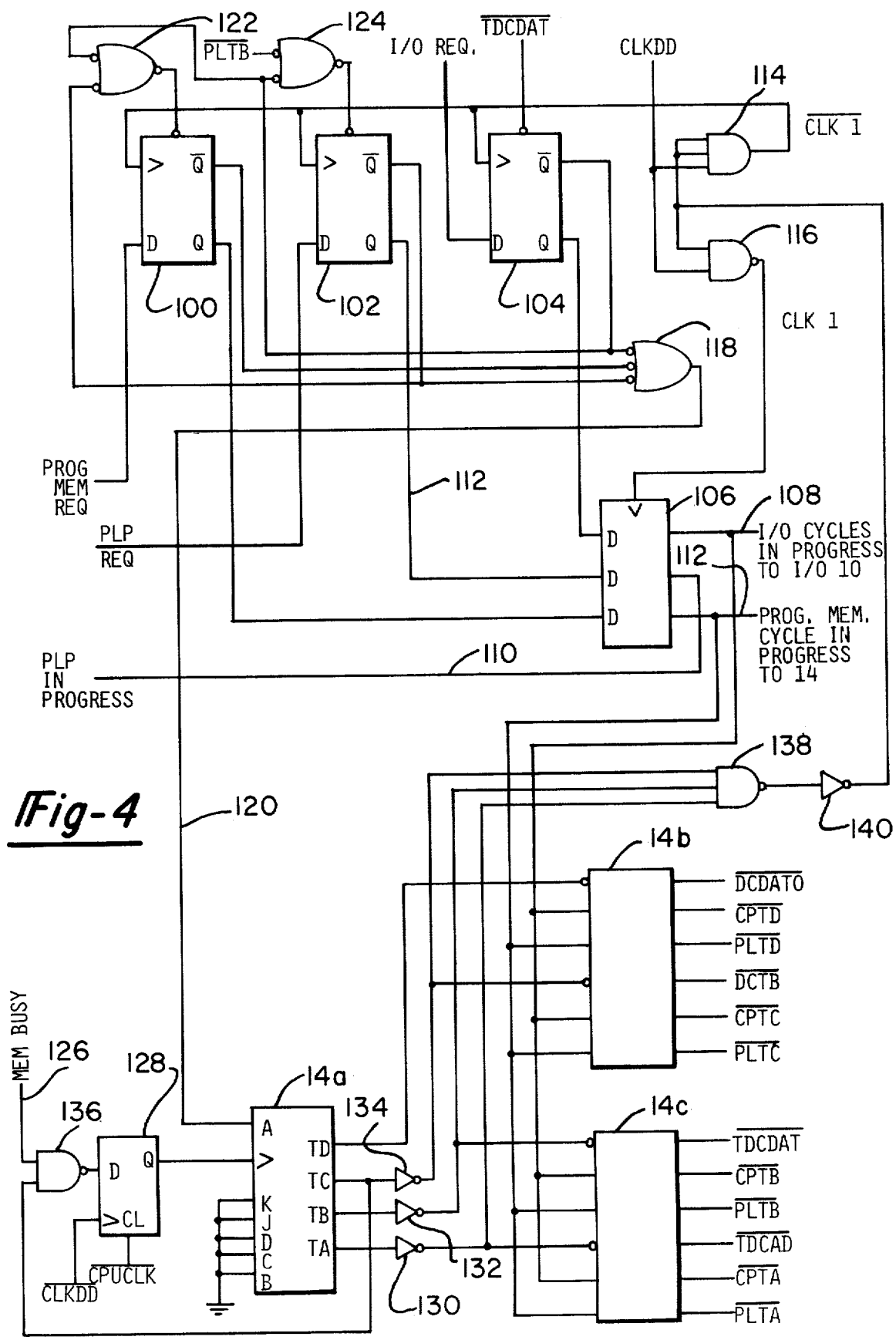

HIGH-SPEED SYNCHRONOUS COMPUTER USING PIPELINED REGISTERS AND A TWO-LEVEL FIXED PRIORITY CIRCUIT

TECHNICAL FIELD

The invention relates to high-speed digital computers utilizing pipelining techniques and particularly to a pipelined micro-instruction generator having improved control means for responding to branch instructions.

BACKGROUND ART

Pipelining is a technique for increasing the effective throughput of a digital computer by stacking up a series of instructions for rapid sequential execution. This is accomplished through the use of serial registers which hold the various instructions in a state of readiness. Time saving results from the instant availability of the next instruction to be executed as opposed to the slower alternative technique of accessing memory for a fresh instruction after the previous instruction has been executed.

Effective pipelining requires anticipation of instructions before they are actually commanded by the program. This is done by means of a sequencer or counter which simply increments the address of the current instruction on the assumption that the most likely next instruction is that having the next address in a numerical sequence. Thus when a jump or branch instruction occurs, some means must be provided to prevent execution of the sequential instructions which have been generated and to substitute the instructions which correspond to the new sequence.

The use of pipelining in a digital computer is described in "VLSI Shakes the Foundation of Computer Architecture" Electronics, May 24, 1979, pp 111-133. That article describes a technique utilizing parallel pipelines, one of which carries the current instructions and the others of which carry the most likely branch instructions. When a branch instruction occurs, the computer simply switches to the pipeline containing the new routine. This technique obviously increases the hardware requirements of the computer for both the parallel pipelines and the control circuitry for the selection thereof.

DISCLOSURE OF THE INVENTION

The present invention provides the effective speed increase of pipelining in a sequencer-controlled instruction generator having improved means to respond to the occurrence of a branch instruction.

In general, the instruction generator comprises a sequencer operating at a first clock rate "CLK 1" to produce instruction addresses, an instruction-storage memory to produce instructions corresponding to the addresses, and a pipeline register connected between the memory and an execution unit so that the sequencer can generate the next following address while the current instruction is being executed. The register operates at a second clock rate "CLK 2" which is synchronous with the first clock rate under normal sequential-instruction conditions, but which is temporarily slowed down upon the appearance of a branch instruction in the pipeline register. During the temporary slowdown of the second clock a new, non-sequential address is loaded into the sequencer, replacing the previous instruction address which, because of the branch, is not to be used. The second clock is not running during this step; hence, the pipeline register does not present the aborted sequential instruction to the execution unit. The second clock thereafter falls back into step with the first clock and the new sequence of instructions moves through the processor in the normal fashion.

In the preferred form, the invention is embodied in a micro-instruction processor operating in conjunction with a macro-instruction source which is also pipelined. In this embodiment, one of the branch instructions which causes the momentary slowdown in CLK 2 also fetches the next macro-instruction address and decodes it to load the sequencer in the micro-instruction processor. This compound pipelining approach provides still further increases in computer throughput.

Another feature of the invention in its preferred form is the use of synchronous arbitration of memory requests at the macro-level. This is accomplished in a two-tier arbitration network, preferably and easily implemented with flip-flops, wherein one tier operates on the CLK 1 complement to arbitrate the requests and the other tier operates on CLK 1 to establish the cycle in progress as a result of the arbitration. The result is synchronism between the memory requests and the memory cycles by arbitrating before the memory is actually needed.

The preferred arbitration technique involves the use of flip-flops which are progressively interconnected such that clocking data through a higher-priority flop automaticaly resets all lower priority flops which may have been set by earlier requests. Although this synchronous technique occasionally exhibits slower response time than the prior art asynchronous arbitration, complete non-ambiguity is achieved.

These and other features and advantages of the invention may be best understood from a reading of the following specification in which the preferred embodiment of the invention is described with reference to the drawings.

BRIEF DESCRIPTION OF DRAWINGS

FIG. 3 is a schematic circuit diagram of a portion of the micro-instruction generator of FIG. 1;

FIG. 4 is a schematic diagram of an arbitration system embodying the synchronous operating principle described above.

BEST MODE FOR CARRYING OUT THE INVENTION

Figure 1:
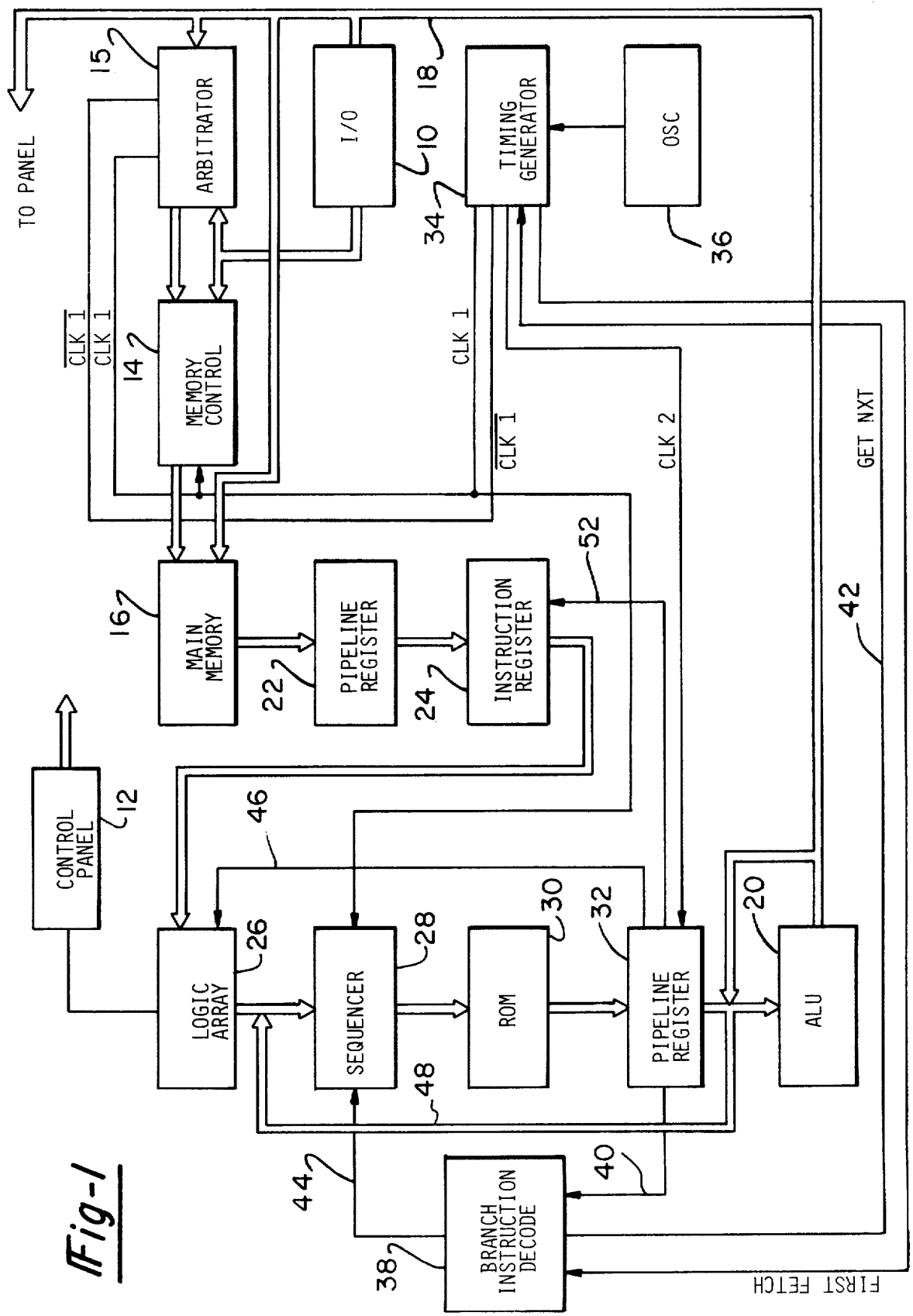
FIG. 1 is an architectural block diagram of a computer embodying the invention.

Referring to FIG. 1, the architectural block diagram shows the illustrative digital processor to comprise an input/output unit 10 such as an alphanumeric keyboard with graphic display, and used in combination with a control panel 12 to establish various machine operating conditions. The input/output unit 10 is connected in data transfer relation to a memory control unit 14 and an arbitrator unit 15 which operates to determine priorities as between various memory access requests. Memory control unit 14 is connected to a programmable memory 16. All of the units 10, 12, 14 and 16 are tied together by a data bus 18, one end of which is connected to arithmetic logic unit (ALU) 20. The architectural block diagram thus far described is essentially conventional.

Program memory 16 operates under the control of memory control unit 14 to supply macro-instructions to a pipeline register 22 and thence to an instruction register 24. As will be apparent to those skilled in the art the pipeline register 22 operates to increase computer throughput by making available the instruction which is most likely to follow the instruction in register 24. In the event the instruction in register 24 calls for a branch or jump, the registers 22 and 24 are simply reloaded by performing a double fetch routine.

Register 24 is connected to a logic array 26 which is the first principal component in a micro-instruction generator further comprising a micro-sequencer 28, a read-only-memory 30 and a micro-instruction pipeline register 32. Sequencer 28 generates sequential addresses at a first clock rate CLK 1 and applies such addresses to the input of read-only-memory 30. In response, memory 30 generates instructions which are applied to pipeline register 32, which operates under the control of a second clock, CLK 2, to apply the sequence of instructions to the ALU 20 for execution.

The micro-instruction generator operates under the control of a timing generator 34 having a base clock oscillator 36 operating at CLKDD to generate three principal timing signals. The first is CLK 1 which is the main synchronizing signal and is applied to the arbitrator 15 and memory control 14 to establish memory cycles in progress and to sequencer 28 to advance the micro-instruction address sequence at the clock rate. The second is $\overline{\text{CLK 1}}$, the complement of CLK 1, and is applied to the arbitrator 15 to conduct the arbitration process. The third is CLK 2 which is applied to the micro-instruction pipeline register 32 to control the transfer of micro-instructions to the ALU 20. Timing generator 34 also operates to either generate or receive certain additional signals in collaboration with a branch instruction decoder 38 under branch or jump instruction conditions as hereinafter described.

Figure 2:
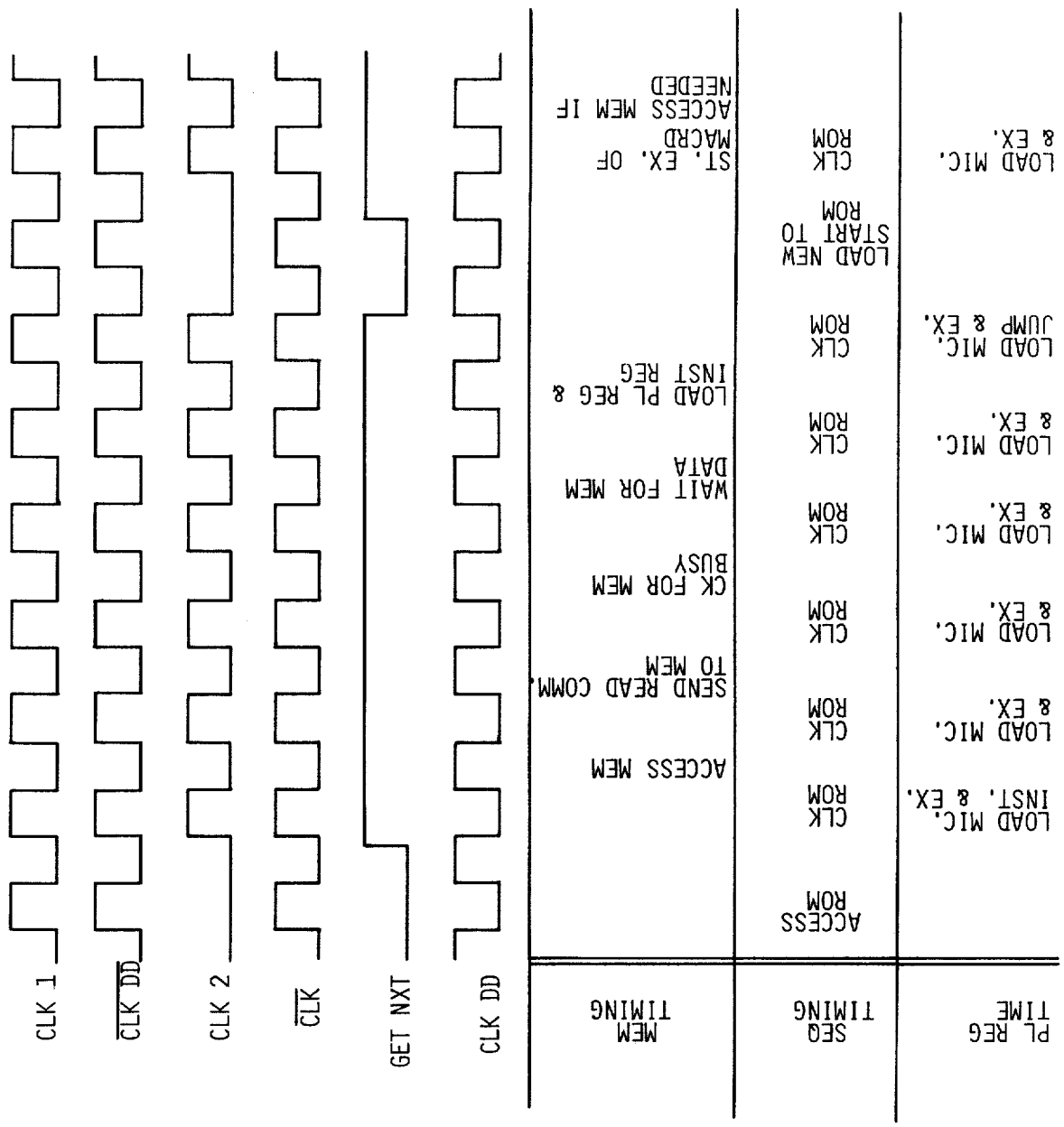
FIG. 2 is a timing diagram illustrating the first and second clock signals and related signals involved in the generation and control of micro-instructions.

Under normal operating conditions data is transferred to and from the various units by way of the data bus 18 to satisfy the demands of the input/output unit 10 and the control program. As each new macro-instruction reaches register 24, the micro-instruction generator comprising sequencer 28, memory 30 and micro-instruction register 32, generates a sequence of micro-instructions which are applied to the ALU 20 at the CLK 1 rate to perform various operations on data in the conventional fashion. As shown in FIG. 2, CLK 1 and CLK 2 normally progress in step and at the same rate such that as micro-instruction register 32 loads an instruction for execution, sequencer 28 and memory 30 generate the next most likely instruction to be executed; i.e., the next instruction in a numerical sequence of instruction addresses.

In the event a branch instruction is loaded into micro-instruction register 32, a signal is transmitted via line 40 to branch instruction decoder 38 which performs two functions; first, a signal entitled "GET NEXT" is removed from the timing generator 34 by way of line 42 to inhibit CLK 2 for one count of CLK 1; secondly, a signal is applied by way of line 44 to the sequencer 28 to prevent it from incrementing in the normal fashion. Depending on the type of branch instruction, register 32 either signals the instruction register 24 and logic array 26 via lines 52 and 46, respectively, of the need for a branch routine instruction address or, alternatively, applies the first branch instruction address directly to sequencer 28 by way of bus 48. In the present system, an instruction calling for the transfer of a new macro-instruction from register 24 activates lines 46 and 52, whereas a conventional branch subroutine followed by a return to the current sequence results in the activation of address bus 48.

Referring again to FIGS. 1 and 2 in combination, it can be seen that as CLK 1 increments while CLK 2 is held off, the first non-sequential instruction is loaded into sequencer 28 and memory 30, effectively eliminating the pipelined instruction which would have followed if the branch instruction had not occurred. At this time, generator 34 applies a signal "FIRST FETCH" to decoder 38 by way of line 50 to release the sequencer 28 and CLK 2. Accordingly, on the next occurrence of CLK 1, CLK 2 also occurs and the micro-instruction pipeline is once again filled; i.e. the first instruction in the new sequence is in register 32 for execution while the next instruction is produced by sequencer 28 and memory 30. Accordingly, the pipeline register 32 never contains an unexecuted instruction due to an aborted fetch.

Referring now to FIG. 3, the details of the timing generator 34, the branch instruction decoder 38, and the micro-instruction generator comprising units 26, 28, 30 and 32 will be described.

In FIG. 3 sequencer 28 is shown to comprise portions 28a and 28b, each of which generates four bits of an 8-bit address for application to the read-only-memory 30. Memory 30 generates a 40-bit instruction for application to register 32, the principal output of which is connected to the arithmetic unit 20 as shown; this interconnection is minimized in FIG. 3 in order to emphasize the interconnections between the micro-instruction register 32 and the balance of the system which is operative during branch instruction conditions.

In FIG. 3 the branch instruction decoder 38 is shown to comprise three units: a branch or jump instruction multiplexer 38a, a jump condition multiplexer 38b and a 4-input positive NOR gate 38c. The output of gate 38c is GET NEXT and is normally high. It goes low upon the occurrence of any branch instruction signal to unit 38a. As shown in FIG. 3 the output of gate 38a is connected to the carry input of sequencer portion 28b so as to permit the sequencer to operate during normal sequential operation in response to the occurrence of CLK 1 from the clock one flip-flop 54. Line 40 from micro-instruction register 32 to multiplexer 38a is actually a parallel pair of data bit lines, the two bits representing the branch type; e.g. a branch requiring a new macro-instruction or simply a branch to a simple subroutine. The micro-instruction register 32 is also connected through four data lines 56 to the multiplexer 38b which looks at a number of test conditions throughout the computer and, if a jump of any kind is indicated, produces a signal on line 58 to activate jump multiplexer 38a. The 4-bit lines 60 from multiplexer 38a are connected into the sequencer portions 28a and 28b as control lines for internal handling of the 8-bit address to be received on the eight input lines of the sequencer 28. The lines 60 are also connected to the four inputs of positive NOR gate 38c to disable GET NEXT under any jump or branch condition.

The timing generator 34 comprises a CLK 1 flip-flop 54, a CLK 2 flip-flop 62, AND gate 64 and FIRST FETCH flip-flop 66. As previously described flip-flop 54 is advanced by the oscillator signal $\overline{\text{CLKDD}}$ and $\overline{\text{CLK}}$ to generate CLK 1 which is applied to the sequencer 28 and to the clock input of flip-flop 66. The GET NEXT signal from gate 38c is applied to gate 64 along with a signal $\overline{\text{PAUSE}}$ to provide a data signal to flip-flop 62, also clocked by $\overline{\text{CLK}}$. The signal $\overline{\text{PAUSE}}$ will be described hereinafter. The absence of GET NEXT for one clock time under branch instruction conditions disables flip-flop 62 to inhibit execution transfer through micro-instruction register 32 as previously described.

The interface circuitry attending line 52 is also shown in detail in FIG. 3 to comprise gate 68 which receives the jump type bits to logically select between jumps which require fetching an instruction from register 24 and jumps which obtain address information directly from the micro-instruction register 32 as previously described. The output of gate 68 is connected through a second gate 72 which logically separates the two branch instructions which call for additional information from register 24; it is to be understood that this particular arrangement is chosen for purposes of illustration only and that the particular implementation and programming of any given computer may increase or decrease the number of any specific instructions and/or data signals. The output of gate 72 is connected back to the micro-instruction register to disable address output lines 48 when the jump instruction address is to come from the logic array 26. The same signal, inverted by inverter 73, is applied as an enable signal to the logic array 26.

When the micro-instruction register 32 develops a signal calling for a transfer from register 24, a signal on line 52 is applied to gate 74 along with a timing signal from the memory controller. This signal enables instruction register 24 to load the instruction into the logic array 26 which operates as a decoder to generate an address to be applied to sequencer 28.

Describing the operation of the circuit of FIG. 3 in greater detail, those skilled in the art will appreciate that the micro processor is a "bit slice" type and is effectively interfaced with the macro-instruction register 24 to generate micro-instructions for execution at high speed under normal sequential operating conditions. With CLK 1 flip-flop 54 and CLK 2 flip-flop 62 operating together and clocked by $\overline{\text{CLKDD}}$ to clock sequencer 28 and micro-instruction register 32 in step and at the same rate. The sequencer addresses step the memory 30 through sequentially adjacent locations. GET NEXT is high during normal sequential operation due to the absence of a signal on line 60. Due to the inherent delays between sequencer 28, ROM 30 and instruction register 32 the register 32 is loaded with data present at the output of the ROM 30 prior to the current rising transition of CLK 1 and CLK 2. With the next following edge of $\overline{\text{CLK}}$ which occurs just prior to the next following edge of $\overline{\text{CLKDD}}$, the CLK 1 and CLK 2 flip-flops 54 and 62, respectively, reset causing CLK 1 and CLK 2 to go low. This sets up CLK 1 and CLK 2 flip-flops 54 and 62 for the next cycle.

If during any cycle, the logic in the memory controller 14 determines that it needs more time before the micro-processor executes another instruction a PAUSE signal will be sent to the timing generator 54 to disable CLK 1 and CLK 2. Thus even though an effective operating pause may be necessary, no loss of synchronism between CLK 1 and CLK 2 occurs.

When a branch instruction reaches register 32, a signal occurs on line 58 to energize line 60 and cause GET NEXT to go low, stopping the sequence and stopping CLK 2 flip-flop 62. In addition, a 2-bit signal identifying the type of jump is applied to multiplexer 38a and to gate 72 (through gate 68) to select either the register 32 or the logic array 26 as the source of the non-sequential instruction address. If it is a branch calling for new data from register 24 the output lines 48 of register 32 are disabled and the sequencer 28 obtains the new address from the logic array 26. If, on the other hand, the branch type signal indicates that register 32 is to be selected to apply the address to sequencer 28, the output of gate 72 disables logic array (decoder) 26 and places the branch address in the sequencer 28 by way of lines 48 from register 32.

CLK 1 continues to clock the sequencer 28. This clocks the starting address of the new sequence into the memory 30 while holding the micro-instruction register 32 as it was prior to the CLK 1 rising edge. As FIRST FETCH is sent to the jump multiplexer 38a, GET NEXT goes high again and on the next occurrence of $\overline{\text{CLKDD}}$, CLK 2 continues with CLK 1 loading the micro-instruction register 32 with the contents of the new starting address and stepping the sequencer 28 and ROM 30 to the next location in sequence. This configuration ensures that the micro-instruction register never contains an instruction that will not be executed.

When special jump codes such as those calling for new information from register 24 are encountered in the micro code, a normal jump condition exists for the sequencer 28 and the clock circuits. However, the jump address comes from the logic array instruction decoder 26 rather than from the register 32. Such a jump or branch instruction starts a memory cycle by causing the instruction register to be loaded with the contents of the pipeline register 22 and then loading the pipeline register with the next most likely instruction.

Referring now to FIG. 4, the details and operation of the arbitration network in establishing the priorities among memory access requests and the memory sequencer controller will be described in detail.

The arbitration system is shown to comprise a first tier of flip-flop 100, 102 and 104, each representing a given memory request function. By way of example, flip-flop 100 receives a "program memory" request, flip-flop 102 receives a "pipeline request" and flip-flop 104 receives an "I/O" request. Flip-flop 104 represents the highest priority request and flip-flop 100 represents the lowest priority request, i.e. in the event of effectively simultaneous requests, flip-flop 102 will prevail over flip-flop 100 and flip-flop 104 will prevail over both of the other two.

The arbitration system further comprises a second tier of flip-flops shown collectively at 106. The data input lines of flip-flops 106 are connected to receive the respective data output lines of flip-flops 100, 102 and 104 such that, when clocked, a signal appears on one of the three output lines of flip-flops 106 to represent the selected cycle. Again, by way of example, output line 108 represents the selection of an I/O cycle, output line 110 represents the selection of a pipeline request, and output line 112 represents the selection of a program memory cycle.

The two tiers of flip-flops representing the arbitration and cycle identification functions are controlled by a pair of complementary operated cycle clock gates 114 and 116. Both of these gates are connected to receive the $\overline{\text{CLKDD}}$ signal and the gates 114 and 116 are interconnected so that gate 114 goes high on $\overline{\text{CLK}}$ 1 and gate 116 goes high on CLK 1. Therefore, the arbitration function which is controlled by the output of gate 114 occurs one-half clock time before the cycle selection function controlled by gate 116 and is, accordingly, one-half clock time ahead of the actual need for cycle selection data.

In FIG. 4 all of the $\overline{Q}$ output lines of flip-flops 100, 102 and 104 are logically combined in gate 118, the output of which appears on line 120 to start a memory cycle through memory controller 14a. Output lines from register 106 designating cycle in progress are similarly connected to selected inputs of memory controller decoders 14b and 14c to provide memory cycle data as hereinafter described.

The memory request arbitration hierarchy or priority listing is established as follows. The $\overline{Q}$ output of flip-flop 102 is connected not only to gate 118 but also through gate 122 to the clear input of the lower priority flip-flop 100. Similarly, the $\overline{Q}$ output of flip-flop 104 is connected not only to gate 118, to start the memory sequence but also through gate 124 to the clear input of flip-flop 102 and through the other input of gate 122 to the clear input of flip-flop 100. Accordingly, the clocking of flip-flop 104 by gate 114 on the occurrence of $\overline{CLKDD}$ not only clocks the I/O request through to flip-flops 106, but also clears flip-flops 100 and 102 in the event data signals (requests) have arrived during the same effective cycle time. The priorities are, therefore, established by hard wiring between the flip-flops 100, 102 and 104 in the arbitration tier and arbitration occurs synchronously but out of step by one-half clock time with the actual cycle selection function. The system of FIG. 4 further provides means for giving a "memory refresh" operation the highest priority. In the following description it is assumed that any such refresh function in progress creates a "memory busy" signal on line 126 to inhibit the memory cycle sequence clock by way of flip-flop 128.

Referring now to the memory sequencer 14a in greater detail, it is apparent that a four clock time sequence is implemented, the clock times being represented by the legends TA, TB, TC and TD and with the cycle beginning by the energization of output line TA. Line TA is connected through inverter 130 to decoder 14c to generate an address for memory access. This selection of the memory address includes data from outputs 108 and 112 of the cycle in progress flip-flops 106 so as to select one of three address enable signals identified in the FIGURE as $\overline{PLTA}$, $\overline{CPTA}$, and $\overline{TDCAD}$. The TB output line which becomes energized on the next clock time after TA is connected through inverter 132 to decoder 14c along with lines 108 and 112 to generate a signal enabling one of 3 data enable signals. Again exemplary legends are given in the drawing. The TC output is connected through inverter 134 to decoder 14b to generate control signals used by the logic that generated the request for the cycle in progress. The TC output line is connected to decoder 14b along with lines 108 and 112 to strobe data resulting from a read operation. The TC output line is also connected back to an input of NAND gate 136 so that memory busy is sampled during TC causing clocks to shift register 14a to stop during a memory refresh. As previously stated, the memory refresh operation is given the highest priority such that when a refresh is going on and a TC state is reached, the memory sequencer clock is disabled until MEMBUSY goes low.

The inverter outputs from 130, 132 and 134 are logically combined in gate 138, the inverted output is connected through inverter 140 to the arbitration/cycle in progress clock comprising gates 114 and 116 so as to disable an output from gate 114, preventing further arbitration until the current memory sequence is completed.

In summary, the arbitration system or network of FIG. 4 provides a first tier of hardwired flip-flops 100, 102 and 104 to receive and arbitrate between memory requests on the basis of a hardwired system of priorities. The winner of the arbitration selection process generates the data signal at flip-flop tier 106 which, when clocked, signals the appropriate part of the overall computer system that its memory request has been granted. The arbitration tier is controlled by $\overline{CLK\ 1}$, and the cycle inprogress flip-flops 106 are controlled by CLK 1, so that arbitration occurs one-half clock time before the actual need for data representing the selected memory function. The entire arbitration process is coordinated with the memory sequence timing so that no further arbirtration can occur until a current selected memory sequence comprising four clock times has been completed. A memory refresh function is given the highest priority through gating to disable the memory sequence clock upon the selection of a write function. It will be noted that the memory refresh function does not require the four clock time memory cycle and hence the refresh operation is not brought into the arbitration flip-flop network.

Although the arbitration system has been described with reference to three specifically selected functions it will be appreciated that any number of functions including the illustrated, as well as other functions, can be arbitrated by mere extension of network.

It is to be understood that the foregoing description is illustrative in character and is not to be construed in a limiting sense.

What is claimed is:

1. A pipelined system for generating instructions in a digital computer comprising:
    means for producing first and second clock signals; CLK 1 and CLK 2, respectively;
    a sequencer operating at the rate of the first clock signal to generate sequential instruction addresses;
    a memory connected to receive the addresses from the sequencer and to produce instructions corresponding thereto;
    a pipeline register connected to the memory to load the instructions for execution at the rate of the second clock signal;
    the first and second clock signals normally being synchronous and at the same rate whereby the register loads a given instruction for execution while the sequencer generates the address of the sequentially following instruction;
    and decoder means responsive to the loading of a branch instruction into the register to cause the sequencer to generate a nonsequential address and to inhibit the second clock signal to prevent the register from loading the sequentially following instruction whereby, upon the next common occurrence of the first and second clock signals an instruction corresponding to the nonsequential address is loaded into the register and the sequencer generates the address of the instruction which follows the nonsequential address in a new sequence.

2. Apparatus as defined in claim 1 wherein said means responsive to the loading of a branch instruction includes a multi-bit interconnection between the pipeline register and the sequencer fo4r transfer of a branch instruction address.

3. Apparatus as defined in claim 1 further including a macro-instruction register and a logic array connected to the macro-instruction register for generating macro-instruction addresses, said means responsive to the loading of a branch instruction including an address interconnection between said logic array and the sequencer, and means connected between the pipeline register and the macro-instruction register for commanding the transfer of a nonsequential instruction address to the sequencer.

4. Apparatus as defined in claim 3 further including a program memory, and a macro-instruction pipeline register connected between the program memory and the macro-instruction register to provide macro-instructions in a pipelined sequence.

5. Apparatus as defined in claim 1 wherein said timing means comprises a first flip-flop for generating CLK 1 and a second flip-flop for generating CLK 2, said decoder means comprising logic means for applying an enable signal GET NEXT effectively simultaneously to the sequencer to control the sequential incrementation thereof and to the second flip-flop to control the generation of CLK 2, said decoder further including means responsive to the loading of a branch instruction into the pipeline register to disable said logic means.

6. Apparatus as defined in claim 5 further including a third flip-flop for re-enabling the logic means, said third flip-flop having one input connected to receive GET NEXT and another input connected to receive CLK 1, and an output connected to the logic means whereby the next occurrence of CLK 1 following the inhibition of CLK 2 enables the logic means and the second flip-flop.

7. Apparatus as defined in claim 1 further including a program memory connected to provide macro-instructions to the sequencer, a memory control unit for operating the memory in response to memory access requests, and arbitration means connected to receive CLK 1 and $\overline{\text{CLK 1}}$ and said memory access requests and connected to said memory control unit to arbitrate between effectively concurrent requests in synchronism with CLK 1.

8. Apparatus as defined in claim 7 wherein the arbitration means comprises a first tier connected to receive and store for processing the memory access requests and a second tier connected to the first tier to receive and store for processing the selected request, said timing means being connected to the arbitration means such that CLK 1 operates the first tier and $\overline{\text{CLK 1}}$ operates the second tier.

9. Apparatus as defined in claim 8 wherein the first tier comprises a plurality fo bistable circuits, equal in number to the number of requests to be arbitrated, each of said circuits having a data input connected to receive a request, a reset input adapted to be connected to higher-priority circuits, and a clock input connected to receive CLK 1.

10. Apparatus as defined in claim 8 wherein the memory control unit includes sequencer means activated upon the selection of an arbitrated request for processing, the combination further including means for disabling said sequencer means during predetermined memory function.

11. A synchronous instruction generating and executing system for use in a data processor comprising: an instruction address generator (28) operable at a first clock rate (CLK 1) to generate sequential instruction addresses but further responsive to external inputs to generate non-sequential instruction addresses;

a memory (30) connected to receive the sequential addresses at the first clock rate and to generate instructions at a first clock rate;

a pipeline register (32) connected to receive the instructions;

an execution unit (20) connected to receive instructions from the pipeline register at a second clock rate (CLK 2) which is normally synchronous with the first clock rate;

an decoder means (38) responsive to the occurrence of a non-sequential instruction in the pipeline register to inhibit the second clock rate for at least one period of the first clock rate to prevent execution of any sequential instruction generated prior to appearance of the non-sequential instruction.

* * * * *